US010826967B1

(12) United States Patent
Qiu et al.

(10) Patent No.: US 10,826,967 B1
(45) Date of Patent: Nov. 3, 2020

(54) PASSING OF DATA VIA DEEP LINKS FOR APPLICATION COMPONENTS

(71) Applicant: Google LLC, Mountain View, CA (US)

(72) Inventors: Lianxiao Qiu, Mountain View, CA (US); Charbel Zaarour, Mountain View, CA (US); Han Tran, Mountain View, CA (US); Guilherme Puglia, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/546,196

(22) Filed: Aug. 20, 2019

(51) Int. Cl.
*G06F 15/16* (2006.01)
*H04L 29/08* (2006.01)
*H04L 29/06* (2006.01)
*G06F 16/9538* (2019.01)
*H04L 12/911* (2013.01)
*G06F 16/955* (2019.01)

(52) U.S. Cl.
CPC .......... *H04L 67/025* (2013.01); *G06F 16/955* (2019.01); *G06F 16/9538* (2019.01); *H04L 47/822* (2013.01); *H04L 47/828* (2013.01); *H04L 67/42* (2013.01)

(58) Field of Classification Search
CPC ..... H04L 67/025; H04L 67/42; H04L 47/822; H04L 47/828; G06F 16/955; G06F 16/9538
See application file for complete search history.

(56) References Cited

U.S. PATENT DOCUMENTS

| 9,608,870 | B1* | 3/2017 | Hendriks | ................ H04L 67/02 |
| 2013/0332518 | A1* | 12/2013 | Chor | ........................ G06F 8/61 |
| | | | | 709/203 |
| 2016/0217456 | A1* | 7/2016 | Gaur | .................. G06Q 20/3278 |
| 2018/0145979 | A1* | 5/2018 | Lu | ........................ H04L 63/0823 |
| 2019/0243627 | A1* | 8/2019 | Balar | ........................ G06F 21/45 |
| 2019/0265958 | A1* | 8/2019 | Ayers | ........................ G06F 21/57 |
| 2020/0106850 | A1* | 4/2020 | Popowitz | ............ H04L 67/2823 |
| 2020/0167174 | A1* | 5/2020 | Desineni | .................. G06F 9/54 |
| 2020/0174635 | A1* | 6/2020 | Choi | ..................... G06F 3/0484 |

* cited by examiner

*Primary Examiner* — Philip B Tran
(74) *Attorney, Agent, or Firm* — Foley & Lardner LLP

(57) ABSTRACT

Systems and methods of passing data via resource identifiers for resources are provided herein. A data processing system can receive a first request from a client device responsive to an interaction with a content item presented on a first resource. The content item can include a resource identifier referencing a second resource accessible via an application to be installed. The first request can include the resource identifier and a device identifier. The data processing system can receive a second request from the client device responsive to an execution of the installed application. The second request can include the device identifier and an application identifier. The data processing system can determine that the application is to receive the request identifier. The data processing system can provide the resource identifier to direct the application to access the second resource for presentation via the application.

20 Claims, 8 Drawing Sheets

PASSING OF DATA VIA DEEP LINKS FOR APPLICATION COMPONENTS

BACKGROUND

In computer networked environments such as the Internet, content providers can provide content items to be inserted into an information resource (e.g., a webpage) processed and rendered by an application (e.g., a web browser) executing on a client device.

SUMMARY

At least one aspect is directed to a method of passing data via resource identifiers. A data processing system having one or more processors can receive a first request for content from a client device responsive to an interaction with a content item presented on a first resource on the client device. The content item can include a resource identifier referencing a second resource accessible via an application to be installed on the client device. The first request can include the resource identifier and a device identifier corresponding to the client device. The data processing system can receive a second request for content from the client device responsive to an execution of the application installed on the client device. The second request can include the device identifier corresponding to the client device and an application identifier corresponding to the application. The data processing system can determine, responsive to receiving the second request, that the application installed on the client device is to receive the request identifier included in the first request based on the device identifier and the resource identifier included in the first request and the device identifier and the application identifier included in the second request. The data processing system can provide, responsive to determining that the application is to receive the request identifier, the resource identifier to direct the application to access the second resource accessible via the resource identifier for presentation via the application.

In some implementations, the data processing system can receive, prior to receiving the first request and the second request, a third request for content from the client device for presentation on the first resource. The third request can include the device identifier corresponding to the client device. In some implementations, the data processing system can determine that the application is not installed on the client device by accessing a database using the device identifier. The database can maintain device identifiers by applications installed on corresponding client devices. In some implementations, the data processing system can select, responsive to determining that the application is not installed on the client device, the content item from a plurality of content items to provide to the client device for display on the first resource in a second application different from the application.

In some implementations, the data processing system can identify, responsive to receiving the first request, the application identifier corresponding to the application to be installed on the client device based on the resource identifier included in the first request. In some implementations, the data processing system can store, on a database, the device identifier and the application identifier as associated with the resource identifier. In some implementations, the data processing system can identify, from the database, the device identifier and the application identifier, responsive to receiving the second request from the client device. In some implementations, determining that the application is to receive the resource identifier can include determining that the device identifier included in the first request matches the device identifier included in the second request and the application identifier identified responsive to receiving the first request matches the application identifier included in the second request In some implementations, the data processing system can generate, responsive to receiving the first request, a first event identifier based on the device identifier included in the first request and the application identifier corresponding to the resource identifier included in the first request. In some implementations, the data processing system can generate, responsive to receiving the second request, a second event identifier based on the device identifier and the application identifier included in the second request. In some implementations, determining that the application is to receive the resource identifier can include determining that the application is to receive the resource identifier by determining that the second event identifier generated from the second request matches the first event identifier generated from the first request.

In some implementations, the data processing system can receive, from the client device, a third request for content generated responsive to the execution of the application installed on the client device. The second request can include at least one of a second device identifier different from the device identifier and a second application identifier different from the application identifier corresponding to the resource identifier included in the first request. In some implementations, the data processing system can determine, responsive to receiving the third request, that application is not to receive the resource identifier based on at least one of determining that the second device identifier does not match the device identifier and determining that second application identifier does not match the application identifier. In some implementations, the data processing system can restrict, responsive to determining that the application is not to receive the resource identifier, provision of the resource identifier to the client device to cause the application to present an initial interface In some implementations, the data processing system can determine, responsive to determining that the application is to receive the resource identifier, that the resource identifier referencing the second resource to access via the application is invalid. In some implementations, the data processing system can restrict, responsive to determining that the resource identifier is invalid, provision of the resource identifier to the client device to cause the application to present an initial interface.

In some implementations, the data processing system can identify, responsive to receiving the first request, the application identifier corresponding to the application to be installed on the client device based on the content item provided to the client device. In some implementations, the data processing system can associate the device identifier and the application identifier from the first request for content with the resource identifier included in the content item provided to the client device.

In some implementations, the data processing system can determine that a length of time between receiving the first request and receiving the second request satisfies a time limit. In some implementations, determining that the application is to receive the resource identifier further comprises determining that the application is to receive the resource identifier in response to determining that the time delay satisfies the time limit.

In some implementations, receiving the first request for content can include receiving the first request responsive to the interaction with the content item presented on the first resource source presented on a second application different from the application on the client device. The interaction with the content item can cause the client device to initiate an application retrieval interface to install the application responsive to determining that the application is not installed on the client device. In some implementations, receiving the second request for content can include receiving the second request generated by the application responsive to a preconfigured function call initiated by the application for retrieval of the resource identifier.

At least one aspect is directed to a system for passing data via resource identifiers. The system can include a data processing system. The data processing system can have one or more processors. The data processing system can receive a first request for content from a client device responsive to an interaction with a content item presented on a first resource on the client device. The content item can include a resource identifier referencing a second resource accessible via an application to be installed on the client device. The first request can include the resource identifier and a device identifier corresponding to the client device. The data processing system can receive a second request for content from the client device responsive to an execution of the application installed on the client device. The second request can include the device identifier corresponding to the client device and an application identifier corresponding to the application. The data processing system can determine, responsive to receiving the second request, that the application installed on the client device is to receive the request identifier included in the first request based on the device identifier and the resource identifier included in the first request and the device identifier and the application identifier included in the second request. The data processing system can provide, responsive to determining that the application is to receive the request identifier, the resource identifier to direct the application to access the second resource accessible via the resource identifier for presentation via the application.

In some implementations, the data processing system can receive, prior to receiving the first request and the second request, a third request for content from the client device for presentation on the first resource. The third request can include the device identifier corresponding to the client device. In some implementations, the data processing system can determine that the application is not installed on the client device by accessing a database using the device identifier. The database can maintain device identifiers by applications installed on corresponding client devices. In some implementations, the data processing system can select, responsive to determining that the application is not installed on the client device, the content item from a plurality of content items to provide to the client device for display on the first resource in a second application different from the application.

In some implementations, the data processing system can identify, responsive to receiving the first request, the application identifier corresponding to the application to be installed on the client device based on the resource identifier included in the first request. In some implementations, the data processing system can store, on a database, the device identifier and the application identifier as associated with the resource identifier. In some implementations, the data processing system can identify, from the database, the device identifier and the application identifier, responsive to receiving the second request from the client device. In some implementations, the data processing system can determine that the device identifier included in the first request matches the device identifier included in the second request and the application identifier identified responsive to receiving the first request matches the application identifier included in the second request In some implementations, the data processing system can generate, responsive to receiving the first request, a first event identifier based on the device identifier included in the first request and the application identifier corresponding to the resource identifier included in the first request. In some implementations, the data processing system can generate, responsive to receiving the second request, a second event identifier based on the device identifier and the application identifier included in the second request. In some implementations, the data processing system can determine that the application is to receive the resource identifier by determining that the second event identifier generated from the second request matches the first event identifier generated from the first request.

In some implementations, the data processing system can receive, from the client device, a third request for content generated responsive to the execution of the application installed on the client device. The second request can include at least one of a second device identifier different from the device identifier and a second application identifier different from the application identifier corresponding to the resource identifier included in the first request. In some implementations, the data processing system can determine, responsive to receiving the third request, that application is not to receive the resource identifier based on at least one of determining that the second device identifier does not match the device identifier and determining that second application identifier does not match the application identifier. In some implementations, the data processing system can restrict, responsive to determining that the application is not to receive the resource identifier, provision of the resource identifier to the client device to cause the application to present an initial interface.

In some implementations, the data processing system can determine, responsive to determining that the application is to receive the resource identifier, that the resource identifier referencing the second resource to access via the application is invalid. In some implementations, the data processing system can restrict, responsive to determining that the resource identifier is invalid, provision of the resource identifier to the client device to cause the application to present an initial interface.

In some implementations, the data processing system can identify, responsive to receiving the first request, the application identifier corresponding to the application to be installed on the client device based on the content item provided to the client device. In some implementations, the data processing system can associate the device identifier and the application identifier from the first request for content with the resource identifier included in the content item provided to the client device.

In some implementations, the data processing system can determine that a length of time between receiving the first request and receiving the second request satisfies a time limit. In some implementations, the data processing system can determine that the application is to receive the resource identifier in response to determining that the time delay satisfies the time limit.

In some implementations, the data processing system can receive the first request responsive to the interaction with the content item presented on the first resource source presented on a second application different from the application on the client device. The interaction with the content item can cause the client device to initiate an application retrieval interface to install the application responsive to determining that the application is not installed on the client device. In some implementations, the data processing system can receive the second request generated by the application responsive to a preconfigured function call initiated by the application for retrieval of the resource identifier.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
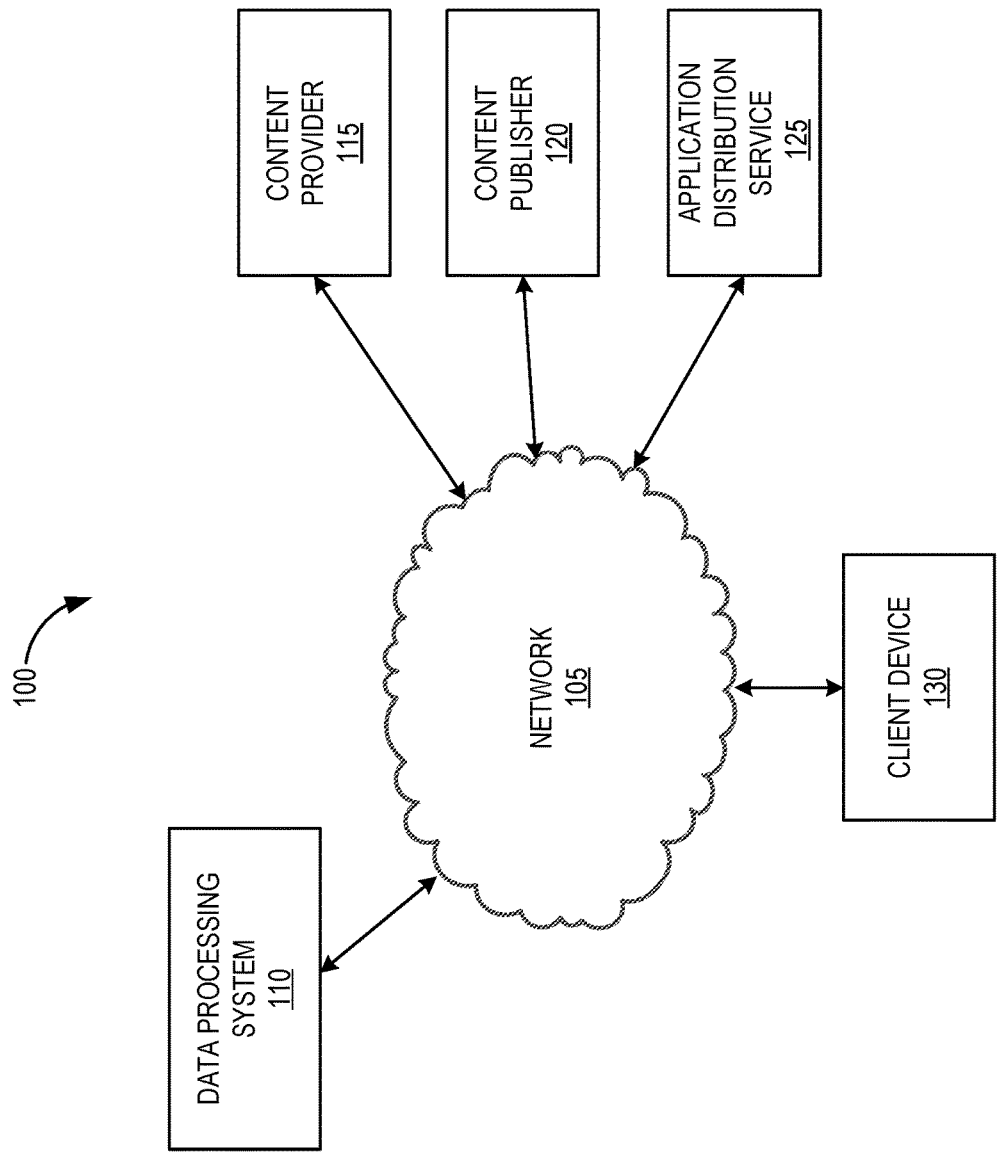
FIG. 1 is a block diagram depicting a system for passing data via resource identifiers for application components, according to an illustrative implementation.

Following below are more detailed descriptions of various concepts related to, and implementations of, methods, apparatuses, and systems of passing data via resource identifiers for application components. The various concepts introduced above and discussed in greater detail below may be implemented in any of numerous ways, as the described concepts are not limited to any particular manner of implementation.

A resource identifier (e.g., a Uniform Resource Identifier (URI)) can reference a specific location for a resource via one or more applications running on a client device. The resource identifier can reference a resource on a network location from the client device, such as a web address (e.g., a Uniform Resource Locator (URL)) for a webpage hosted by a webserver on the Internet accessible using a web browser. The resource identifier for the resource hosted on the network location can include a scheme name for a protocol, a domain name to the server, and a pathname for the particular webpage (e.g., "https://www.example.com/dir1/index.html"). The web browser on the client device can use such resource identifiers to request and retrieve webpages from webservers. The resource identifier can also reference a resource of an application local to the client device, such as a deep link for an in-app component of the application. An operating system on the client device can use such resource identifiers to launch and execute the application to access the in-app component.

Using these resource identifiers, information resources of different applications can be accessed across the applications on the same client device. One application (e.g., a web browser) on the client device can present an information resource (e.g., a webpage) containing a content item with a resource identifier. The resource identifier (e.g., a hyperlink) of the content item can reference an in-app component of another application. The resource identifier for the resource local to the client device can include an application identifier (e.g., "example_app") for the application and a pathname (e.g., "//foo") for the particular in-app component (e.g., "example_app://foo"). Upon detecting an interaction by a user operating the client device with the resource identifier, the operating system on the client device can launch the application already installed on the client device. Once launched, the operating system can cause the application to open the in-app component referenced by the resource identifier.

However, the application referenced by the resource identifier may not have been downloaded or installed on the client device. In such scenarios, without proper configuration, the resource identifier can result in no action being taken in response to the interaction on the resource identifier or in an error on the part of the operating system running on the client device. The lack of any particular action can result in a deviation from the behavior of the applications running on the client device expected by the user, thereby degrading human-computer interactions (HCI) between the user and the applications. Furthermore, the deviation may also cause the user to repeatedly interact with the resource identifier or to manually search for the application on the client device. As a result, this can lead to unnecessary and excessive consumption of computing processing resources and memory.

One approach to address such scenarios may include deferred deep linking. Under this technique, the operating system can launch a content delivery platform to prompt the user to install the application, when the application is determined to not have been installed. Once installed, the content delivery platform can present a prompt to the user to launch and execute the application. While deferred deep linking can facilitate the installation of the application on the client device, the technique may not be able to cause the application to open the in-app component within the application referenced by the resource identifier. As such, the user may be forced to manually search for the in-app component originally referenced by the resource identifier. Furthermore, the deferred deep linking approach may still result in a degradation of HCI between the user and the application and the additional consumption of computing resources due to the manual searching.

To resolve challenges in accessing in-app components using resource identifiers, data may be passed asynchronously via deep links over a network environments. A data processing system can provide the content item configured to send an asynchronous request with the resource identifier concurrent to the opening of the content delivery platform. The request can include the resource identifier for the in-app component of the application to be installed on the client device and a device identifier corresponding to the client device. Upon receipt of the request, the data processing system can parse the request and can log the resource identifier as associated with the device identifier for storage on a database. Concurrent to the sending of the request, the operating system on the client device can cause the content delivery platform to prompt the user to install the application. Once installed, the content delivery platform can present a prompt to the user to launch and execute the application.

With the execution via the prompt on the content delivery platform, the now installed application can generate and send a request for the resource identifier to the data processing system to ensure that the in-app component of the application is presented on the client device. The request sent by the application can include an application identifier corresponding to the application itself and the device identifier corresponding the client device. Upon receipt, the data processing system can determine whether the device identifiers of the received request and of the previously received request match for application corresponding to the resource identifier. If the device identifiers are determined to match, the data processing system can return the resource identifier to the application. The application in turn can open and present the in-app component referenced by the resource identifier.

By configuring the content item and the application in this manner, there can be a more seamless transition from the information resource presented on the initial application to the in-app component of the to-be-installed application. With the elimination of manual installation of the application and searching to access the in-app component, the number of interactions by the user of the client device can be lowered. The reduction in the number of interaction can result in the improvement of HCI between the user and the client device as well a decrease in the consumption of computing resources.

Referring now to FIG. 1, depicted is a block diagram depicting one implementation of a computer networked environment or a system 100 for passing data via resource identifiers for application components. In overview, the system 100 can include at least one network 105 for communication among the components of the system 100. The system 100 can include at least one data processing system 110 to handle requests communicated via the network 105. The system 100 can include at least one content provider 115 to provide content items. The system 100 can include at least one content publisher 120 to provide information resources (e.g., webpages). The system 100 can include at least one application distribution service 125 to provide installation packages to setup applications. The system 100 can include at least one client device 130 to communicate via the network 105. Each of the components (e.g., the network 105, the data processing system 100 and its components, the content provider 115 and its components, the content publisher 120 and its components, the application distribution service 125 and its components, and the client device 130 and its components) of the system 100 can be implemented using the components of a computing system 700 detailed herein in conjunction with FIG. 7.

In further detail, the network 105 of the system 100 can communicatively couple the data processing system 110, the content provider 115, the content publisher 120, the application distribution service 125, and the client devices 130 with one another. The data processing system 110, the content provider 115, the content publisher 120, and the application distribution service 125 of the system 100 each can include a plurality of servers located in at least one data center or server farm communicatively coupled with one another via the network 105. The data processing system 110 can communicate via the network 105 with the content provider 115, the content publisher 120, the application distribution service 125, and the client devices 130. The content provider 115 can communicate via the network 105 with the data processing system 110, the content publisher 120, the application distribution service 125, and the client devices 130. The content publisher 120 can communicate via the network 105 with the data processing system 110, the content publisher 120, the application distribution service 125, and the client devices 130. The application distribution service 125 can communicate via the network 105 with the data processing system 110, the content provider 115, the content publisher 120, and the client devices 130. The client device 130 can communicate via the network 105 with the data processing system 110, the content provider 115, the content publisher 120, and the application distribution service 125.

The content provider 115 can include servers or other computing devices operated by a content provider entity to provide content items for display on information resources at the client device 130. The content provided by the content provider 115 can take any convenient form. For example, the third-party content may include content related to other displayed content and may be, for example, pages of a website that are related to displayed content. The content may include third party content items or creatives (e.g., ads) for display on information resources, such as an information resource including primary content provided by the content publisher 120. The content items can also be displayed on a search results web page. For instance, the content provider 115 can provide or be the source of content items for display in content slots (e.g., inline frame elements) of the information resource, such as a web page of a company where the primary content of the web page is provided by the company, or for display on a search results landing page provided by a search engine. The content items associated with the content provider 115 can be displayed on information resources besides webpages, such as content displayed as part of the execution of an application on a smartphone or other client device 130.

The content publisher 120 can include servers or other computing devices operated by a content publishing entity to provide information resources including primary content for display via the network 105. For instance, the content publisher 120 can include a web page operator who provides primary content for display on the information resource. The information resource can include content other than that provided by the content publisher 120, and the information resource can include content slots configured for the display of content items from the content provider 115. For instance, the content publisher 120 can operate the website of a company and can provide content about that company for display on web pages of the website. The web pages can include content slots configured for the display of content items provided by the content provider 115 or by the content publisher 120 itself. In some implementations, the content publisher 120 includes a search engine computing device (e.g. server) of a search engine operator that operates a search engine website. The primary content of search engine web pages (e.g., a results or landing web page) can include results of a search as well as third party content items displayed in content slots of the information resource such as content items from the content provider 115. In some implementations, the content publisher 120 can include one or more servers for providing video content.

The data processing system 110 can include servers or other computing devices operated by a content placement entity to select or identify content items to insert into the content slots of information resources via the network 105. In some implementations, the data processing system 110 can include a content placement system (e.g., an online ad server). The data processing system 110 can maintain an inventory of content items to select from to provide over the network 105 for insertion into content slots of information resources. The inventory may be maintained on a database accessible to the data processing system 110. The content items or identifiers to the content items (e.g., addresses) can be provided by the content provider 115.

The application distribution service 125 (sometimes herein referred to as a digital distribution service, a content delivery service, or an electronic software distribution service) can include servers or other computing devices operated by an application distributor entity to provide installation packages for applications to be installed on the client devices 130. The application distribution service 125 can manage updates to the application installed on the client devices 130. The updates can affect at least one of the subcomponents of the application. The application distribution service 125 can also manage services for the facilitation the installation of the application on client devices 130. The provision of the application and related services by the application distribution service 125 can be communicated via the network 105. In some implementations, the application distribution service 125 can be separate from the data processing system 110 (e.g., as depicted). In some implementations, the application distribution service 125 can be at least partially or fully be a part of the data processing system 110.

Each client device 130 can a computing device to communicate via the network 105 to display data. The displayed data can include the content provided by the content publisher 120 (e.g., the information resource) and the content provided by the content provider 115 (e.g., the content item for display in a content slot of the information resource) as identified by the data processing system 110. The client device 130 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 130 can also communicate via the network 105 to receive installation packages to install applications thereon.

Figure 2:
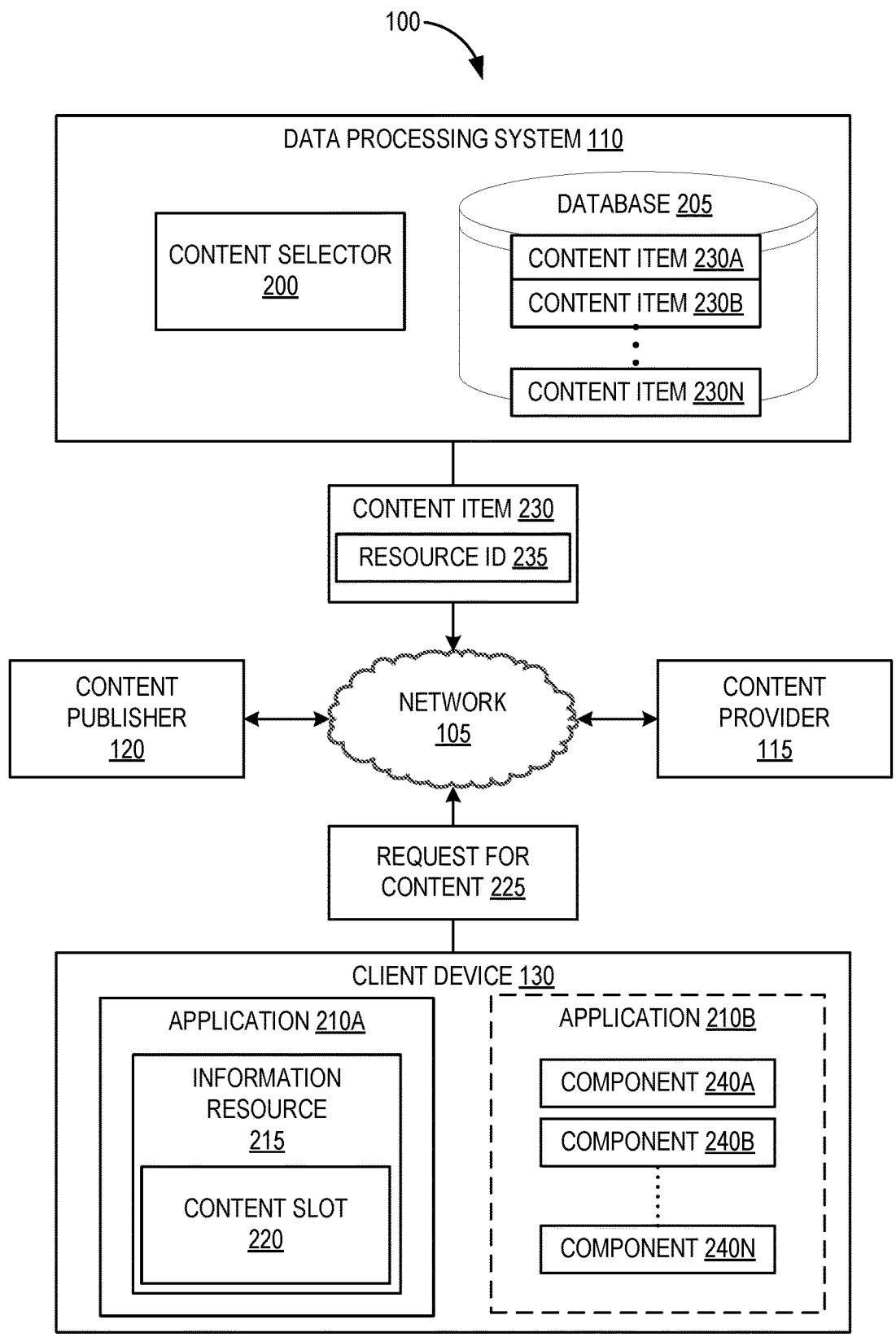
FIG. 2 is a block diagram depicting a data processing system, a content publisher, a content provider, and a client device in a system for passing data via resource identifiers for application components, according to an illustrative implementation.

Referring now to FIG. 2, depicted is a block diagram depicting the data processing system 110, the content provider 115, the content publisher 120, and the client device 130 communicating via the network 105 in the system 100.

In overview, the data processing system 110 can include at least one content selector 200 to provide content to the client device 130. The data processing system 110 can include at least one database 205 to store and maintain one or more content items 230A-N (hereinafter generally referred to as content item 230). The client device 130 can include at least one application 210A installed and executing thereon to communicate via the network 105 to request and receive content.

In further detail, the application 210A (sometimes herein generally referred to as the first application 210A) executing on the client device 130 can communicate via the network 105 to receive content for presentation (e.g., display or playback) on the client device. The application 210A include, for example, an Internet browser, a mobile application, or any other computer program capable of interpreting, executing or otherwise invoking computer-executable instructions provided to the client device 130 via the network 105 for presentation on the client device 130. The application 210A may have been previously installed on the client device 130. For example, the application 210A may have been downloaded and installed via the network 105 or may have been pre-installed on the client device 130. The installation and execution of the application 210A can be facilitate by an operating system running on the client device 130.

The application 210A can receive at least one information resource 215 (e.g., a webpage) from the content publisher 120 via the network 105. The information resource 215 can be a type of resource, access to which can be facilitated by communications via the network 105. The receipt of the information resource 215 can be in response to a request for the information resource 215 sent by the application 210A to the content publisher 120. The information resource 215 can correspond to a script, logic, markup, or instructions (e.g., HyperText Markup Language (HTML), Extensible HyperText Markup Language (XHTML), Extensible Markup Language (XML), Cascading Style Sheets (CSS), and JavaScript, or any combination thereof). The information resource 215 can include at least one primary content (e.g., body, text, and images of the webpage) and at least one content slot 220 (e.g., an inline frame of a webpage). The primary content can correspond to a portion of the information resource 215 that is provided by the content publisher 120. The content slot 220 of the information resource 215 can be available to receive content from the content provider 115 or the data processing system 110. The content to be inserted into the content slot 220 of the information resource 215 can have a different hostname from the hostname of the information resource 215.

With the receipt or the accessing of the information resource 215, the application 210A can parse the information resource 215 to identify the content slot 220. The content slot 220 can include a script, logic, markup, or instructions (e.g., an ad tag) to generate requests for content to transmit via the network 105. In parsing the content slot 220 of the information resource 215, the application 210A can generate a request for content 225 to insert into the content slot 220 to transmit to the data processing system 110 (or the content provider 115). The request for content 225 can include a destination address (e.g., uniform resource locator (URL) or Internet Protocol (IP) address) referencing the data processing system 110 that is to provide content to insert into the content slot 220. In some implementations, the request for content 225 can include a source address (e.g., a network address such as an IP address) or a device identifier referencing the client device 130 as the sender. The device identifier can be a set of alphanumeric characters or a numerical value to uniquely identify the client device 130. The device identifier can be maintained on the client device 130 (e.g., by the operating system running thereon). In some implementations, the source address referencing the client device 130 can be used as the device identifier for the client device 130. Upon generation, the application 210A can transmit the request for content 225 via the network 105 to the data processing system 110.

The content selector 200 executing on the data processing system 110 can receive the request for content 225 from the client device 130 via the network 105. Based on the received request for content 225, the content selector 200 can identify or otherwise select at least one content item 230 from the set of content items 230 maintained on the database 205. The selection of the content item 230 can be in accordance with a content placement process (e.g., real-time bidding (RTB) performed by a content exchange). Each content item 230 can include an object or element (e.g., a document model tree object) to embed, insert, or otherwise add to the content slot 220 of the information resource 215.

At least one of the content items 230 to be selected by the content selector 200 can include at least one resource identifier 235. The resource identifier 235 can reference a resource accessible via at least one application 210B different from the application 210A that transmitted the request for content 225. The application 210B may not yet be received, downloaded, or installed on the client device 130 (as indicated with a dotted line as depicted). The resource corresponding to the resource identifier 235 can include one of a set of components 240A-N (hereinafter generally referred to as components 240). The resource identifier 235 can include a set of alphanumeric characters uniquely identifying the application 210B and the component 240 of the application 210B. In some implementations, the resource identifier 235 can also identify one or more parameters to be passed to the component 240.

The set of alphanumeric characters for the resource identifier 235 can be in accordance with a defined syntax, such as a URL or a Uniform Resource Identifier (URI). The resource identifier 235 can include a substring referencing the application 210B, a sub string referencing a particular component 240 accessible via the application 210B, and a sub string for parameters to be passed to the component 240. In the syntax, the substring for the application 210B can correspond to a scheme or host of the resource identifier 235. The sub string for the component 240 can correspond to a pathname of the resource identifier 235. The substring for the parameters to be passed to the component 240 can correspond to a query of the resource identifier 235. For example, the resource identifier 235 may be a deep link, and include a substring for the application 210B, "example_app", and a substring for the particular component 240 with parameters, "//component_X?param=xyz", combining to the string, "example_app://component_X?param=xyz".

Each component 240 (also sometimes referred herein as an application component, in-app content, or in-app feature) can be a type of resource, access to which can be facilitated by communications via the network 105. In some implementations, the application 210B can define the presentation of each component 240 accessible through the application 210B. For example, the application 210B can have or define a particular graphical user interface (GUI) for each component 240 accessible through the application 210B itself. The definition of the component 240 can differ from the information resource 215 in that the application 210A may not have a particular GUI for the information resource 215. In some implementations, the information resource 215 can correspond to one of the components of the already installed application 210A. In some implementations, the content items 230 with the resource identifier 235 can have a script to facilitate the accessing of the component 240 referenced by the resource identifier 235. The functionalities of the content items 230 with such resource identifiers 235 will be detailed herein below.

Conversely, at least one of the content items 230 to be selected by the content selector 200 can lack resource identifiers 235 to one of the components 240 of the application 210B not yet installed on the client device 130. Instead, the content item 230 can have a destination identifier (e.g., a URL) referencing another information resource (e.g., a webpage or a component) to be accessed via the same application 210A that transmitted the request for content 225. The destination identifier can be a set of alphanumeric characters in accordance with a defined syntax, such as a URI or URL. Content items 230 with such destination identifiers can include a script to cause the application 210A to send a request using the destination identifier in response to detecting an interaction on the content item 230. The script of such content items 230 may lack any facilitation of request related to the accessing of the component 240 of the application 210B.

In running the content placement process to select from the set of content items 230, the content selector 200 can result in selecting the content item 230 with or without the resource identifier 235. In some cases, the content item 230 selected as a result of the content placement process by the content selector 200 can lack the resource identifier 235. The selected content item 230 can include the destination address referencing another resource to be accessed via the first application 210A. In other cases, the content item 230 selected as a result of the content placement process can include the resource identifier 235 referencing the component 240 of the application 210B. In such cases, the content selector 200 can determine whether to the script to facilitate the accessing of the component 240 referenced by the resource identifier 235. With the selection of the content item 230, the content selector 200 can transmit the content item 230 to the client device 130 via the network 105. In the example depicted, the content item 230 transmitted to the client device 130 can include the resource identifier 235. In some implementations, the content selector 200 can record that the content item 230 is transmitted to the client device 130 onto the database 205.

To determine whether to include the script for the resource identifier 235 prior to transmission, the content selector 200 can identify or determine which applications (e.g., the application 210A) are installed on the client device 130 based on the request for content 225. For each resource identifier 235 in the content item 230, the content selector 200 can determine whether the application 210B is installed on the client device 130. In some implementations, the content selector 200 can access a list of applications installed on client devices 130 indexed by corresponding device identifiers using the device identifier included in the request for content 225. In some implementations, the list of applications can maintained on at least one database maintained by the application distribution service 125. In some implementations, the list of applications can be maintained on the database 205 accessible by the data processing system 110.

When the list of application indicates that application 210B is not installed on the client device 130, the content selector 200 can determine that the application 210B is not installed on the client device 130. Furthermore, in some implementations, the content selector 200 can include or insert the script to facilitate the accessing of the component 240 of the application 210B referenced by the resource identifier 235. In some implementations, the inserted script itself can include the resource identifier 235. On the other hand, when the list of application indicates that the application 210B is installed on the client device 130, the content selector 200 can determine that the application 210B is installed on the client device 130. As the application 210B may already be installed on the client device 130, the content item 230 can lack the script to facilitate the accessing of the component 240 referenced by the resource identifier 235.

The application 210A can receive the content item 230 from the data processing system 110 via the network 105. With the receipt of the content item 230, the application 210A can embed, insert, or otherwise include the content item 230 into the content slot 220 of the information resource 215. Inserting the content item 230, the application 210A can present or display the content item 230 into the content slot 220 of the information resource 215. In some implementations, the resource identifier 235 or the destination identifier in the content item 230 can be visible (e.g., as a link within the content item 230). In some implementations, the content item 230 can include the resource identifier 235 or the destination identifier as part of another constituent visual element (e.g., as a rendered image corresponding to the content item 230 on the information resource 215).

Figure 3:
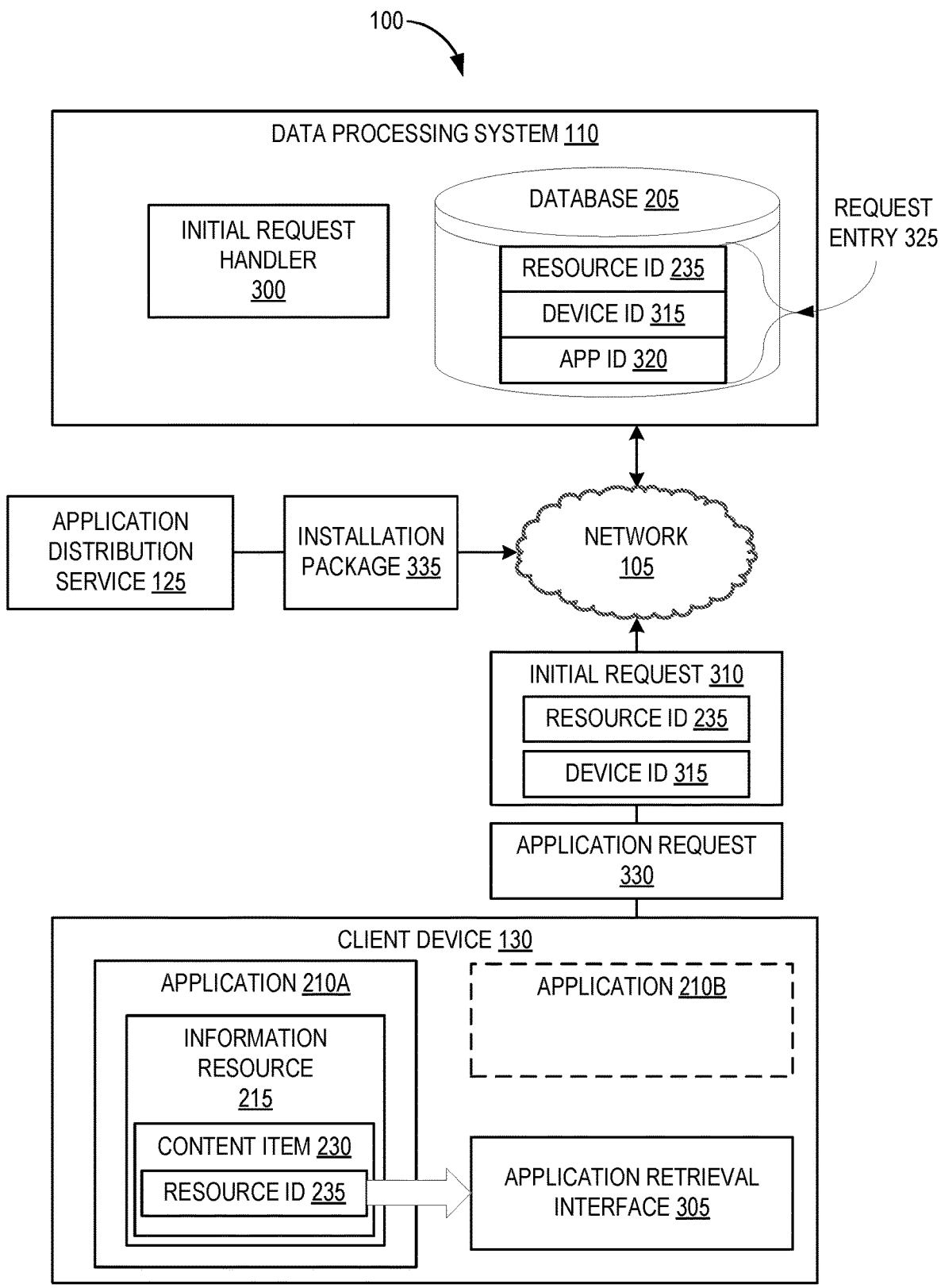
FIG. 3 is a block diagram depicting a data processing system, an application distribution service, and a client device calling an application distribution interface in a system for passing data via resource identifiers for application components, according to an illustrative implementation.

Referring now to FIG. 3, depicted is a block diagram depicting the data processing system 110, the application distribution service 125, and the client device 130 communicating via the network 105 in the system 100. In overview, the data processing system 110 can have at least one initial request handler 300 (sometimes herein referred to as an asynchronous request handler) to handle requests from the client device 130. The application 210A may have inserted the content item 230 into the content slot 220 for presentation on the information resource 215. The client device 130 can also include at least one application retrieval interface 305 (also referred herein as a digital distribution platform, a content delivery platform, or an application store program) to facilitate the accessing of the component 240 of the application 210B.

In further detail, the application 210A can monitor for at least one interaction with the content item 230 presented on the information resource 215. In some implementations, the application 210A can monitor for the interaction with a subcomponent of the content item 230 (e.g., the resource identifier 235 itself if included). The monitoring of the interaction can be performed via an event handler or an event listener for the content item 230. The interaction monitored by the application 210A can include, for example, a click event, a touch screen event, a keypress event, and a voice command event, among others. With the detection of interaction with the content item 230, the application 210A can parse and perform the instructions included in the content item 230.

Using the destination identifier included in the content item 230, the application 210A can generate and transmit at least one request for content in response to the interaction. The application 210A may have received the content item 230 with the destination identifier for another resource accessible via the same application 210A. The resource may be another information resource 215, such as a landing page for the content item 230. The destination identifier can reference another content publisher 120 hosting the resource to be accessed. The content publisher 120 corresponding to the destination identifier can differ from the content publisher 120 that provided the initial information resource 215. In reading the content item 230, the application 210A can generate the request for content including the destination identifier. The application 210A can transmit the request for content via the network 105 to the content publisher 120. Subsequently, the application 210A can receive the resource referenced by the destination identifier from the content publisher 120 via the network 105. The application 210A can be directed from the initial information resource 215 and can present the newly received resource on the client device 130.

Using the resource identifier 235 included in the content item 230, the application 210A can generate and transmit at least one request for content in response to the interaction. The application 210A may have received the content item 230 with the resource identifier 235 referencing one of the components 240 of the application 210B already installed on the client device 130 (e.g., contrary to depiction). Such a content item 230 may lack a script to facilitate the accessing of the component 240 referenced by the resource identifier 235. In such cases, the application 210A can read and parse the resource identifier 235 included in the content item 230. As the resource identifier 235 references the application 210B that is already installed on the client device 130, the application 210A (or an operating system of the client device 130) can invoke the application 210B to access the component 240. In response, the client device 130 can present the component 240 of the application 210B referenced by the resource identifier 235.

The application 210A can generate and transmit at least one initial request 310 for content (e.g., as depicted) in response to the interaction on the content item 230. The application 210A may have received the content item 230 with the resource identifier 235 referencing one of the components 240 of the application 210B not installed on the client device 130. In some implementations, such a content item 230 can include the script to facilitate the accessing of the component 240 referenced by the resource identifier 235. The script of the content item 230 can include instructions for the application 210A to generate and send the initial request 310 using the resource identifier 235 included in the content item 230.

The initial request 310 to be transmitted by the application 210A can include the resource identifier 235 corresponding to the one included in the content item 230. In some implementations, the application 210A can identify the resource identifier 235 corresponding to the interaction with the content item 230 to include in the initial request 310. For example, the application 210A can detect a touch event on one of the hyperlinks on the content item 230 including the resource identifier 235 and identify the resource identifier 235 to include into the initial request 310. Upon identification from the content item 230, the application 210A can insert or include the resource identifier 235 into the initial request 310.

Furthermore, the initial request 310 to be transmitted by the application 210A can include at least one device identifier 315 (e.g., the device identifier as previously discussed) referencing the client device 130. The device identifier 315 be a set of alphanumeric characters or a numerical value to uniquely identify the client device 130. The device identifier 315 can be maintained on the client device 130 (e.g., by the operating system running thereon). The application 210A can identify the device identifier 315 maintained on the client device 130 to insert into the initial request 310. In some implementations, the device identifier 315 can be a network address (e.g., an IP address) referencing the client device 130 in the network 105. The application 210A can identify the network address as the device identifier 315 to insert into the initial request 310. Similar to the initial request for content 225, the initial request 310 can also include the destination address referencing the data processing system 110 and can include the source address referencing the client device 130. Upon generation, the application 210A can transmit the initial request 310 to the data processing system 110 via the network 105 (e.g., as depicted).

The initial request handler 300 executing on the data processing system 110 can receive the initial request 310 from the client device 130 via the network 105. The initial request handler 300 can parse the initial request 310 to identify the contents. In parsing, the initial request handler 300 can identify the device identifier 315 referencing the client device 130 from the initial request 310. In some implementations, the initial request handler 300 can identify the source address (e.g., the IP address) corresponding to the client device 130 from the initial request 310. With the identification, the initial request handler 300 can use the source address corresponding to the client device 130 as the device identifier 315.

Additionally, the initial request handler 300 can identify the resource identifier 325 from the initial request 310. Using the resource identifier 325, the initial request handler 300 can generate, determine, or identify at least one application identifier 320 corresponding to the application 210B referenced by the resource identifier 325. The application identifier 320 can be a set of alphanumeric characters or a numerical value to uniquely identify the application 210B to be installed on the client device 130. As previously discussed, the resource identifier 325 can include a substring for the application 210B, a substring for the component 240, and a substring for parameters. In some implementations, the initial request handler 300 can identify the substring for the application 210B from the resource identifier 235 as the application identifier 320.

In some implementations, the initial request handler 300 can use the substring for the application 210B of the resource identifier 235 to identify the application identifier 320. For example, the initial request handler 300 can use a mapping of substrings (e.g., "example_app") to full application names (e.g., "App Example") in identifying the application identifier 320. In some implementations, the initial request handler 300 can determine or identify the application identifier 320 based on the content item 230 previously provided to the client device 130. The content item 230 can be associated with the application identifier 320. As previously discussed, the content selector 200 may have recorded that the content item 230 is transmitted to the client device 130. Based on the recording, the initial request handler 300 can identify the content item 230 provided to the content device 130. The initial request handler 300 can identify the application identifier 320 associated with the identified content item 230.

In some implementations, the initial request handler 300 can determine or generate at least one event identifier (also sometimes referred herein as a request identifier, an interaction identifier, or a click identifier) using the initial request 310. The event identifier can be a set of alphanumeric characters or a numerical value to uniquely identify or associate with the contents of the initial request 310. In some implementations, the initial request handler 300 can generate the event identifier based on the application identifier 320 (or the resource identifier 235) and the device identifier 315. The generation can be based on any combination of the application identifier 320 and the device identifier 315, such as a concatenation, a hash function, a fingerprint function, among others. In some implementations, the initial request handler 300 can identify a time of receipt of the initial request 310 to associate with the contents therein.

With these identifications, the initial request handler 300 can associate the resource identifier 235, the device identifier 315, and the application identifier 320 with one another. For example, the resource identifier 235 and the device identifier 315 from the initial request 310 can be associated with the application identifier 320. The initial request handler 300 can also store and maintain the resource identifier 235, the device identifier 315, and the application identifier 320 on the database 205 to indicate the association among the identifiers. In some implementations, the initial request handler 300 can also store the event identifier along with the other identifiers. In some implementations, the initial request handler 300 can generate or create at least one request entry 325 using the resource identifier 235, the device identifier 315, and the application identifier 320 for storage onto the database 205. The request entry 325 can include the resource identifier 235, the device identifier 315, and the application identifier 320 to indicate the association among the identifiers. In some implementations, the request entry 325 can also include the event identifier generated using the device identifier 315 and the application identifier 320. The resource identifier 235, the device identifier 315, the application identifier 320, or the event identifier can be used to index the request entry 325 stored and maintained on the database 205. In some implementations, the request entry 325 can further include the time of receipt of the corresponding initial request 310.

In conjunction with the generation and transmission of the initial request 310, the application 210A (or an operating system on the client device 130) can invoke the application retrieval interface 305 executing on the client device 130. The application retrieval interface 305 can be at least one routine, program, or another application on the client device 130 to facilitate installation of the application 210B onto the client device 130. The application 210A (or the operating system) can determine that the application 210B referenced by the resource identifier 235 is not installed on the client device 130. For example, the application 210A can access a file manager maintained by the client device 130 listing the applications installed thereon. In response to the determination, the application 210A can invoke the application retrieval interface 305 to install the application 210B. The application 210A may have been configured to invoke the application retrieval interface 305 when an application (e.g., the application 210B) that is not installed is referenced.

Upon invocation, the application retrieval interface 305 can present at least one prompt for installing the application 210B onto the client device 130. Using the prompt, the user of the client device 130 can request for the installation or can decline the installation of the application 210B. In some implementations, the prompt can include at least one graphical user interface (GUI) displayed on the client device 130. The prompt can include at least one user interface element to request installation of the application 210B (e.g., a command button with the text "Install") and at least one user interface element to decline the installation of the application 210B (e.g., a command button with the text "Cancel"). In some implementation, the prompt can include at least one audio message to play on the client device 130. The audio message at least one option to request installation and at least one option to decline installation of the application 210B.

The application retrieval interface 305 can monitor at least one interaction with the prompt for installing the application 210B. The interaction can include, for example, a click event, a touch screen event, a keypress event, and a voice command event, among others. The application retrieval interface 305 can detect an interaction corresponding to a declination to install the application 210B. For example, the user of the client device 130 can click the cancel button on the GUI for the prompt or click to minimize the application retrieval interface 305. In response, the application retrieval interface 305 may perform no further action associated with the installation of the application 210B. On the other hand, the application retrieval interface 305 can detect an interaction corresponding to a request to install the application 210B. For example, the user of the client device 130 can have pressed the command button of the GUI for the prompt to install or produced a voice command to install the application 210B. In response, the application retrieval interface 305 can generate at least one application request 330 for installation of the application 210B. The application request 330 can include at least one identifier for the application 210B. The identifier can be a set of alphanumeric characters corresponding to the application 210B, and can be the same or different from the application identifier 320 used by the data processing system 110. Upon generation, the application retrieval interface 305 can transmit the application request 330 to the application distribution service 125.

In turn, the application distribution service 125 can receive the application request 330 from the client device 130 via the network 105. Upon receipt, the application distribution service 125 can parse the application request 330 to identify the identifier for the application 210B. Using the identifier, the application distribution service 125 can identify at least one installation package 335 for installation of the application 210B. The installation packages 335 can be maintained by the application distribution service 125 on one or more databases, and can be provided by an application developer for the application 210B. The installation package 335 can include one or more files containing resources, assets, metadata, and program code for setting up the application 210B on the client device 210B. With the identification, the application distribution service 125 can provide or transmit the installation package 335 to the client device 130 via the network 105.

Figure 4:
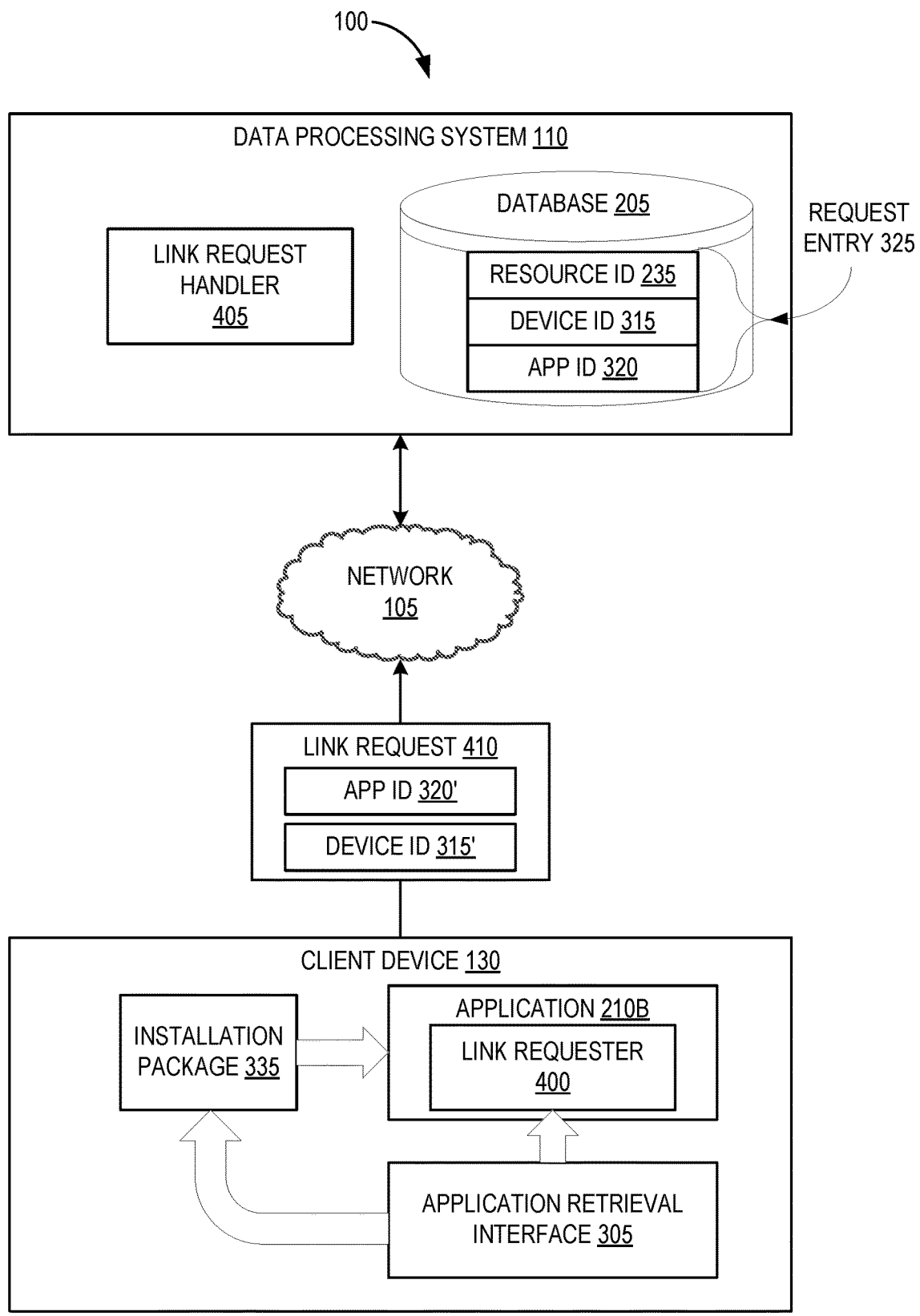
FIG. 4 is a block diagram depicting a data processing system and a client device calling a link requester of an application in a system for passing data via resource identifiers for application components, according to an illustrative implementation.

Referring now to FIG. 4, depicted is a block diagram of the client device 130 requesting the data processing system 110 via the network 105 in the system 100. In overview, the data processing system 110 can include at least one link request handler 405 (sometimes referred herein as a synchronous request handler) to handle requests from the client device 130. The application 210B on the client device 130 can include at least one link requester 400 to handle requests to the data processing system 110.

In further detail, the application retrieval interface 305 can receive the installation package 335 for setting up the application 210B from the application distribution service 125 via the network 105. Upon receipt, the application retrieval interface 305 can use the installation package 335 to install the application 210B onto the client device 130. For example, the application retrieval interface 305 can extract or unpack one or more files of the installation package 335 to setup the application 210B on the client device. Upon completion of the installation, the application retrieval interface 305 can present at least one prompt to execute the application 210B. The application retrieval interface 305 can monitor for interactions with the prompt. In response to detecting the interaction, the application retrieval interface 305 can invoke the application 210B to execute on the client device 130. In some implementations, the application retrieval interface 305 can invoke the now installed application 210B to execute without presenting the prompt. Once invoked, the client device 130 can initialize and commence execution of the application 210B. The client device 130 can transfer the foreground process from the application 210A or the application retrieval interface 305 to the now installed application 210B.

Upon installation on the client device 130, the application 210B can invoke, call, or otherwise execute the link requester 400. The link requester 400 may correspond to one or more routines, processes, or otherwise functions configured into the application 210B. In some implementations, the functionalities and operations of the link requester 400 may be defined via an application programming interface (API) set forth by an administrator of the application distribution service 125 or the data processing system 110. The API for the link requester 400 may be made available to the application developer of the application 210B and to the administrator of the data processing system 110. In some implementations, the application 210B can call or invoke the link requester 400 during initialization or execution of the application 210B itself. For example, the link requester 400 can be one of the first processes invoked by the application 210B while running on the client device 130. In some implementations, the link requester 400 can be invoked by the client device 130 during unpacking or installation of the application 210B using the installation package 335.

The link requester 400 of the application 210B executing on the client device 130 can generate and transmit at least one link request 410 (sometimes referred to herein as a synchronous request) to retrieve the resource identifier 235 previously provided to the client device 130. The generation of the link request 410 can be in accordance with at least one function of the API defined for the link requester 400. The link requester 400 can be provided with information for generating the link request 410. The information can be in the form of a data structure or metadata included with the application 200B. The information can include the application identifier 320' corresponding to the application 210B and used by the data processing system 100 to reference the application 210B on the database 205. The information can lack the resource identifier 235 previously provided to the client device 130 with the content item 230.

The link request 410 to be transmitted to the data processing system 110 can include the application identifier 320' corresponding to the application 210B. In some implementations, the link requester 400 can identify the application identifier 320' from the information included in the application 200B. Upon identification, the link requester 400 can include or insert the application identifier 320' into the link request 410 (e.g., as depicted). In some implementations, the link requester 400 can identify the identifier for the application 210B used by the application distribution service 125. The information included with the application 210B can include the identifier for the application 210B, and not the application identifier 320' used by the data processing system 110 to maintain the database 205. With the identification, the link requester 400 can include the identifier for the application 210B into the link request 410.

In addition, the link request 410 can include the device identifier 315'. The identification of the device identifier 315' by the link requester 400 can be similar to the identification of the same identifier by the application 210A as previously described. In some implementations, the link requester 400 can identify the device identifier 315' maintained on the client device 130 to insert into the link request 410. In some implementations, the link requester 400 can identify the network address referencing the client device 130 as the device identifier 315' to insert into the link request 410. Similar to the request for content 225, the link request 410 can also include the destination address referencing the data processing system 110 and can include the source address referencing the client device 130. Upon generation, the link requester 400 can transmit the link request 410 to the data processing system 110 via the network 105.

The link request handler 405 executing on the data processing system 110 can receive the link request 410 from the client device 130 via the network 105. The link request handler 405 can have many of the same functionalities with respect to the link request 410 as the initial request handler 300 has with respect to the initial request 310 as previously described. The link request handler 405 can parse the link request 410 to identify the contents. The parsing of the link request 410 can be in accordance with the API used to generate the link request 410. In parsing, the link request handler 405 can identify the device identifier 315' referencing the client device 130 from the link request 410. In some implementations, the link request handler 405 can identify the source address (e.g., the IP address) corresponding to the client device 130 from the link request 410 to use as the device identifier 315'.

In addition, the link request handler 405 can parse the link request 410 to identify the application identifier 320'. In some implementations, the link request handler 405 can identify the identifier for the application 210B included in the link request 410. Using the identifier parsed from the link request 410, the link request handler 405 can identify the application identifier 320' corresponding to the application 210B. For example, the link request handler 405 can use a mapping of identifiers used by the application distribution service 125 in identifying the application identifier 320'.

In some implementations, the link request handler 405 can determine or generate at least one event identifier using the link request 410. The generation of the event identifier using the link request 410 may be similar to the generation of the event identifier by the initial request handler 300 using the initial request 310. The event identifier can be a set of alphanumeric characters or a numerical value to uniquely identify or associate with the contents of the link request 410. In some implementations, the link request handler 405 can generate the event identifier based on the application identifier 320' and the device identifier 315'. The generation can be based on any combination of the application identifier 320' and the device identifier 315', such as a concatenation, a hash function, a fingerprint function, among others. In some implementations, the link request handler 405 can identify a time of receipt of the link request 410.

Figure 5:
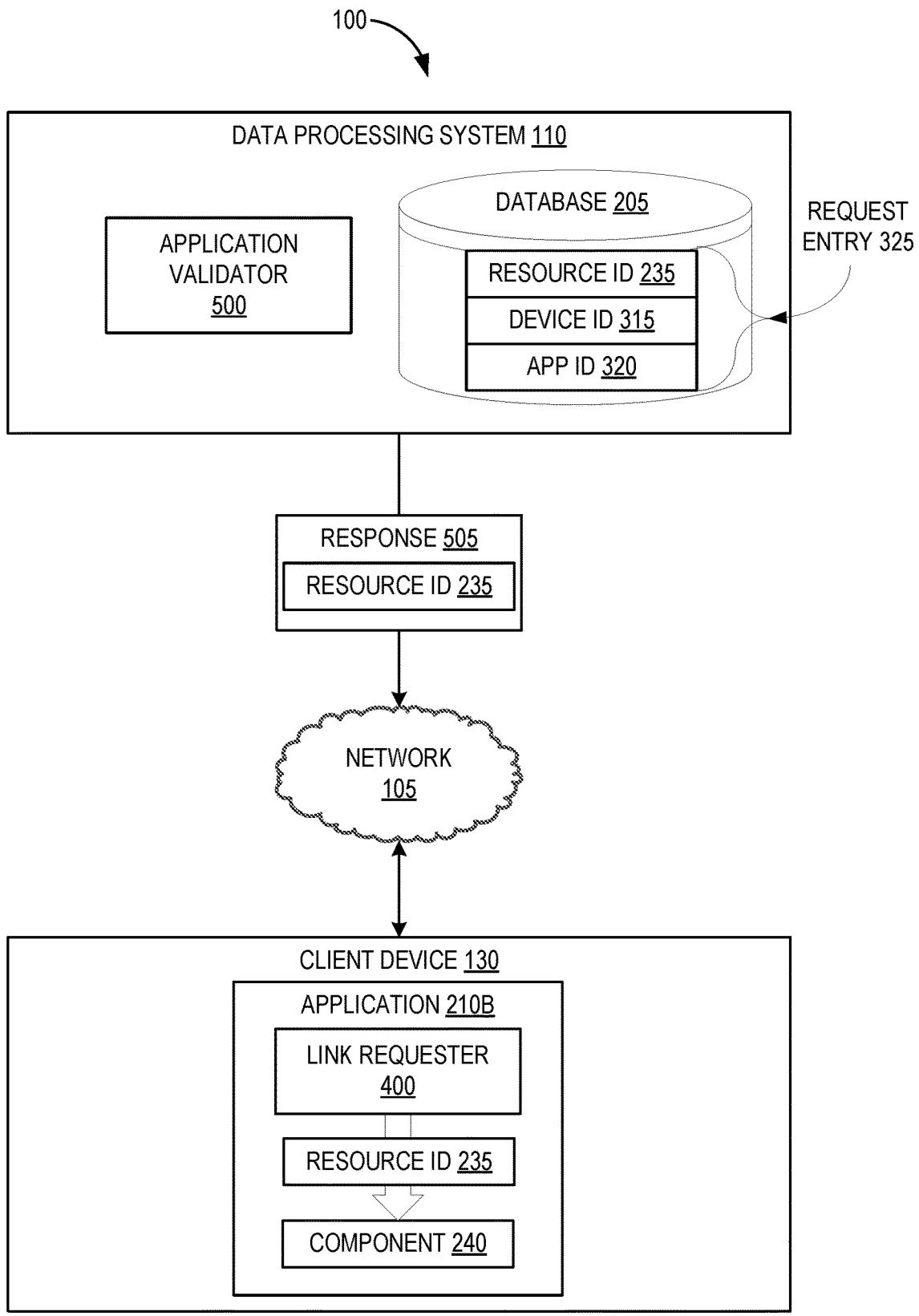
FIG. 5 is a flow diagram depicting a data processing system and a client device calling a component of an application in a system for passing data via resource identifiers for application components, according to an illustrative implementation.

Referring now to FIG. 5, depicted is a block diagram of the data processing system 110 responding to the client device 130 via the network 105 in the system 100. In overview, the data processing system 110 can include at least one application validator 500 to authenticate the application 210B now installed on the client device 130. The application validator 500 executing on the data processing system 110 can determine whether the application 210B on the client device 130 is to receive the resource identifier 235. The determination may be based on the initial request 310 and the link request 410 received from the client device 130. In some implementations, the determination may be responsive to the parsing of the link request 410 by the link request handler 405 to identify the device identifier 315' and the application identifier 320'.

To determine, the application validator 500 can compare the device identifier 315' and the application identifier 320' parsed from the link request 410 with the device identifier 315 and the application identifier 320 maintained on the database 205. In some implementations, the application validator 500 can use the device identifier 315' to search or lookup the database 205 for the request entry 325 with a matching device identifier 315. In some implementations, the application validator 500 can use the event identifier generated using the link request 410 to perform the search. In performing the search, the application validator 500 can traverse through the request entries 325 maintained on the database 205. When no matching request entry 320 is found, the application validator 500 can determine that the device identifier 315' of the link request 410 does not match with any of the device identifiers 315 maintained on the database 205. The application validator 500 can also determine that the application 210B on the client device 130 is not permitted to receive any resource identifiers 235 for accessing components 240 of the application 210B.

Conversely, when at least one matching request entry 325 is found, the application validator 500 can perform addition comparisons. The matching request entry 325 can have the device identifier 315 matching the device identifier 315' parsed from the link request 410. In some implementations, the event identifier of the matching request entry 325 generated using the initial request 310 can match with the event identifier generated using the link request 410. The application validator 500 can compare the application identifier 320' with the application identifier 320. When the application identifier 320' differs from the application identifier 320, the application validator 500 can search the database 205 to look for another request entry 325 using the device identifier 315'. The application validator 500 can repeat the search until no request entries 325 with the device identifier 315' (or event identifiers) are found. After traversing through the database 205, the application validator 500 can determine that the application 210B is not permitted to receive any resource identifiers 235 for accessing components 240 of the application 210B. In contrast, when the application identifier 320' matches the application identifier 320, the application validator 500 can determine that the application 210B is permitted to receive the resource identifier 235 to access the component 240.

The application validator 500 can use other factors to determine that the application 210B is not permitted to receive the resource identifier 235. The determination may be despite finding the request entry 325 with the device identifier 315 and the application identifier 320 that is determined to match the device identifier 315' and the application identifier 320' respectively. In some implementations, the application validator 500 can calculate or determine a length of time between the receipt of the initial request 310 and the receipt of the link request 410. The determination of the length of time can be based on the time of receipt for the initial request 310 and the time of receipt of the link request 410 (e.g., difference in time). With the determination, the application validator 500 can compare the length of time to a time limit. The time limit may correspond to an amount of time during which the user of the client device 130 is expected to request for installation and initiate execution of the application 210B. The time limit can represent a cutoff length of time to demarcate when the application 210B is permitted to receive the resource identifier 235. When the length of time is determined to satisfy the time limit (e.g., less than or equal to), the application validator 500 can maintain the determination that the application 210B is to receive the resource identifier 235. Otherwise, when the length of time is determine to not satisfy the time limit (e.g., greater than), the application validator 500 can override the determination.

When the application 210B is determined to be not permitted to receive the resource identifier 235, the application validator 500 can restrict the provision of the resource identifier 235 to the application 210B on the client device 130. In some implementations, the application validator 500 can provide no response to the client device 210B in response to the link request 410. In some implementations, the application validator 500 can provide or transmit a response without any resource identifier 235 to the client device 130 via the network 105. The response may indicate that the application 210B running on the client device 130 is determined to be restricted from receipt of any resource identifiers 235.

In contrast, when the application 210B is determined to be permitted to receive the resource identifier 235, the application validator 500 can identify the resource identifier 235 included the matching request entry 325. In some implementations, the application validator 500 can determine whether the resource identifier 235 is valid. The determination of the validity of the resource identifier 235 can be in accordance with a defined syntax (e.g., syntax rules for URIs or deep links). For example, the resource identifier 235 determined to be invalid can have an improper syntax, such as: a lack of pathname to any particular component 240 of the application 210B, an incorrect pathname to the component 240, or incorrect scheme for referencing the application 210B.

If the resource identifier 235 is determined to be invalid, the application validator 500 can override the determination that the application 210B is permitted to receive the resource identifier 235. Furthermore, the application validator 500 can restrict the provision of the resource identifier 235, and can perform the functions as described above in response to such a determination. On the other hand, if the resource identifier 235 is determined to be valid, the application validator 500 can maintain the determination that the application 210B is permitted to receive the resource identifier 235. The application validator 500 can also identify the resource identifier 235 to respond to the link request 410.

With the identification of the resource identifier 235, the application validator 500 can provide or transmit the resource identifier 235 to the application 210B via the network 105. In some implementations, the resource identifier 235 can be included as part of at least one response 505. The application validator 500 can generate the response 505 including the resource identifier 235 identified from the request entry 325 maintained on the database 205. Upon generation, the application validator 500 can transmit the response 505 with the resource identifier 235 to the client device 130 via the network 105.

Subsequent to the transmission of the link request 410, the link requester 400 can wait for the response 505 from the data processing system 110. In some implementations, the link requester 400 can maintain a timer to count a time elapsed since the transmission of the link request 410 to the data processing system 110. The link requester 400 can compare the elapsed time to a time limit for receipt of the resource identifier 235 (or the response 505 including the resource identifier 235). When the elapsed time becomes greater than the time limit, the link requester 400 can determine that the application 210B is not receiving any request identifiers 325. In addition, the link requester 400 cause or invoke the application 210B to present an initial interface of the application 210B. The initial interface can be a graphical user interface (GUI) (e.g., a launch screen or a splash screen) to be presented by default by the application 210.

On the other hand, the link requester 400 of the application 210B can receive the resource identifier 235 from the data processing system 110 via the network 105. The receipt of the resource identifier 235 can be within the time limit for receipt. The resource identifier 235 may be included as part of the response 505. The link requester 400 can parse the response 505 to identify the resource identifier 235. Upon identification, the link requester 400 can direct, cause, or invoke the application 210B to access the component 240 (a form of a resource) via the resource identifier 235 received from the data processing system 110. Once invoked, the application 210B can present the component 240 referenced by the resource identifier 235 on the client device 130 (e.g., for display or via audio output). In some implementations, the application 210B can invoke one or more functions of the component 240 (or the application 210B in general) based on the parameters passed via the resource identifier 235. In some implementations, the application 210B can also communicate via the network 105 to request for data and other resources in presenting the component 240. The resource accessed by the application 210B in presenting the component 240 can be hosted on one or more servers administering the application 210B, such as another content publisher 120.

In this manner, the transition from the information resource 215 presented on the application 210A to the component 240 of the application 210B that was not initially installed or available can be performed by the client device 130 in a more seamless fashion. By sending out the initial request 310 and the link request 410 as described, the manual search for installing the application 210B and then to find the particular component 240 in the application 210B can be eliminated. This elimination may reduce the number of interactions performed on the client device 130, decreasing the consumption of computing resources on the client device 130 and the network bandwidth on the network 105. Furthermore, the reduction of number of interactions can result in the improvement to the human-computer interactions (HCI) between the user with the client device 130. In particular, the HCI with the information resource 215 and the content item 230 presented by the application 210A and the component 240 of the application 210 may be ameliorated.

Figure 6A:
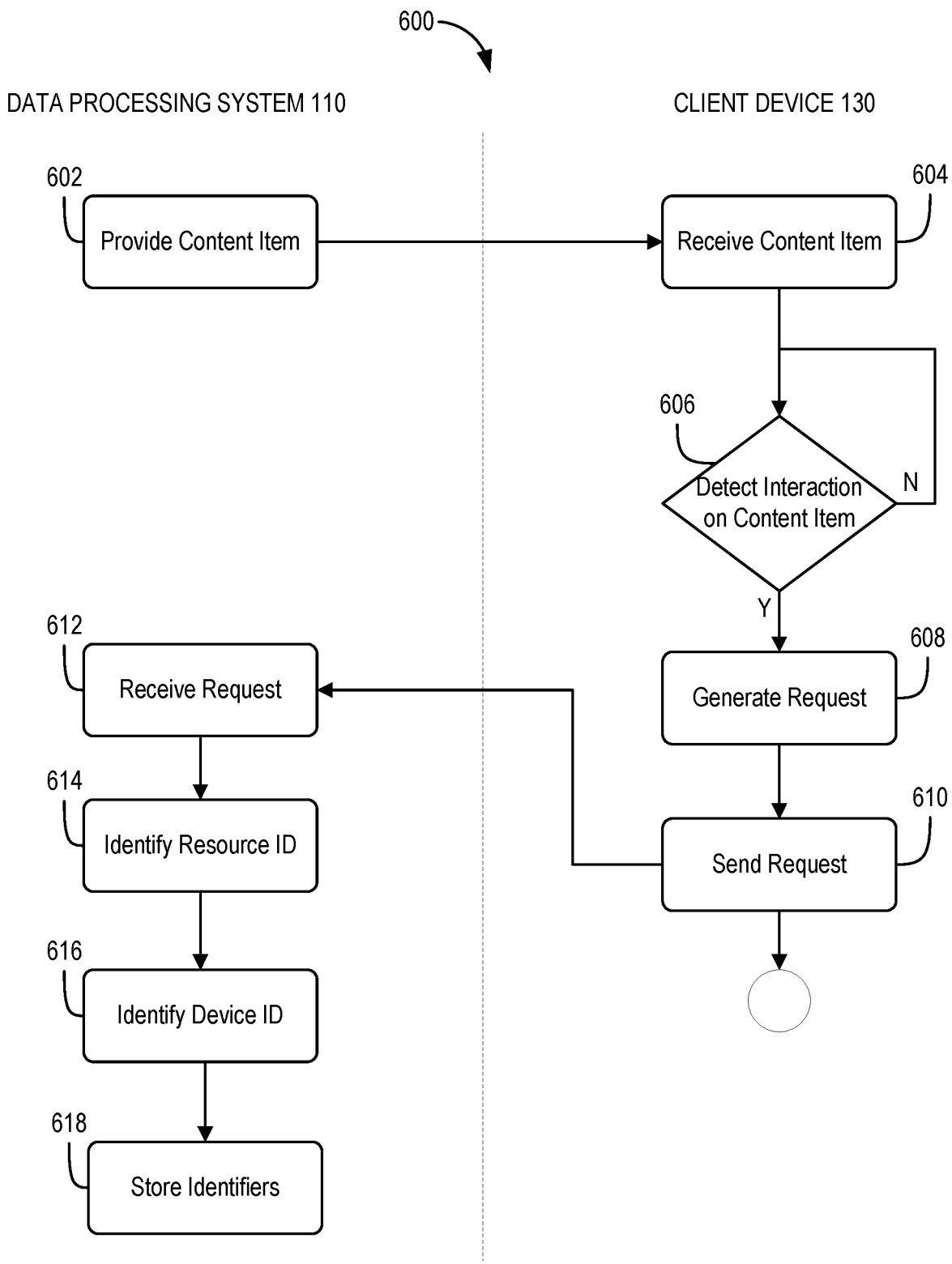
FIGS. 6A and 6B are flow diagrams depicting a method of passing data via resource identifiers for application components, according to an illustrative implementation.
Figure 6B:
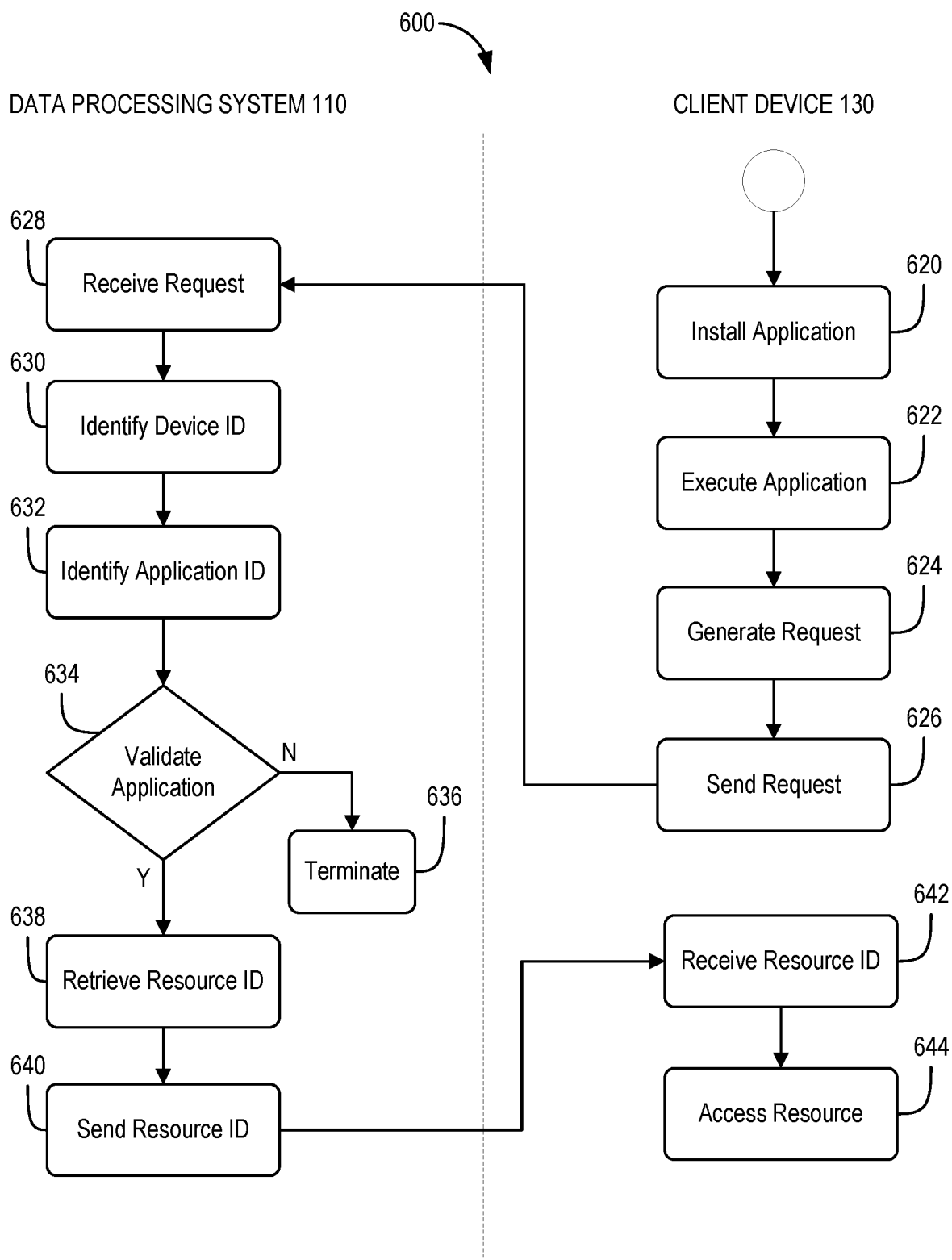
Figure 7:
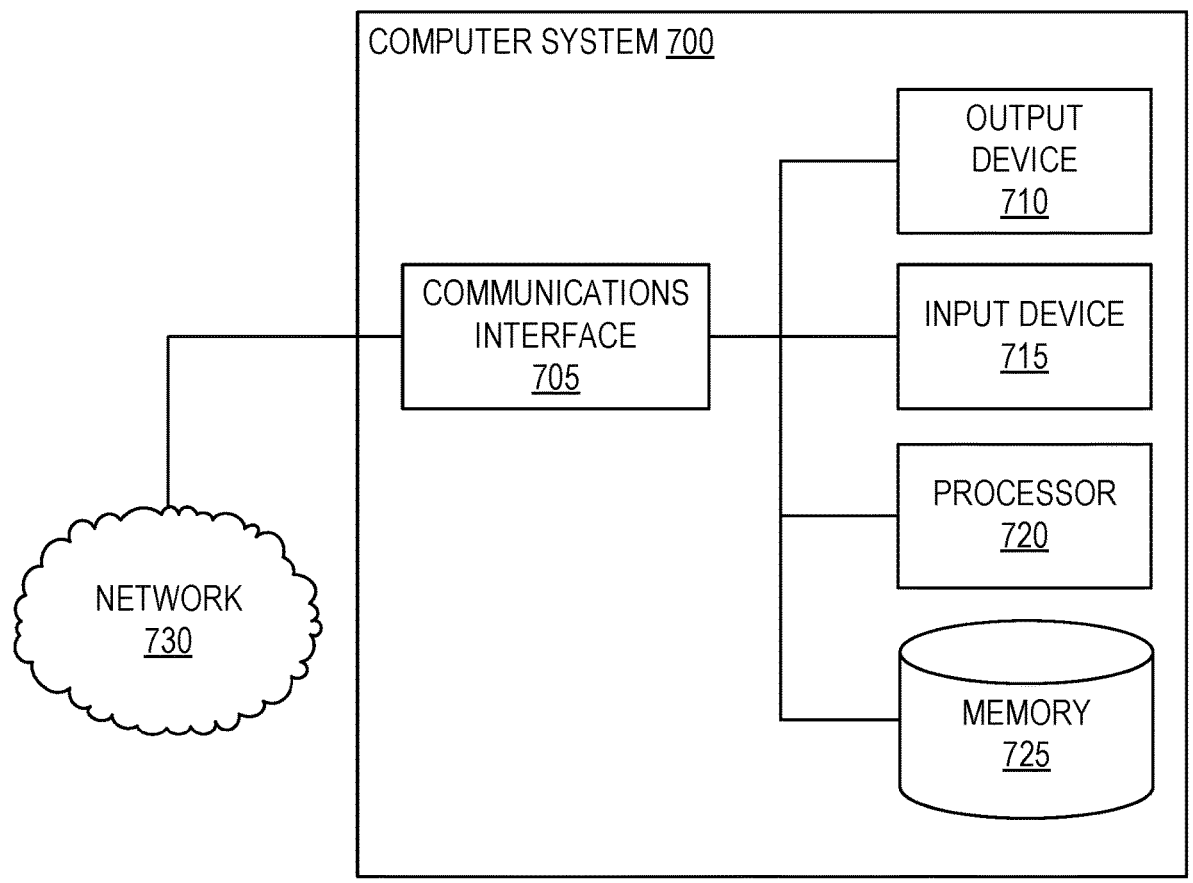
FIG. 7 is a block diagram illustrating a general architecture for a computer system that may be employed to implement elements of the systems and methods described and illustrated herein, according to an illustrative implementation.

Referring now to FIGS. 6A and 6B, depicted is a flow diagram depicting on implementation of a method 600 of passing data via resource identifiers for application components. The functionality described herein with respect to method 600 can be performed or otherwise executed by the system 100 as shown on FIGS. 1-5 or a computing system 700 as shown in FIG. 7. In brief overview, a data processing system can provide a content item (602). A client device can receive the content item (604). The client device can monitor for an interaction with the content item (606). If an interaction is detected, the client device can generate a first request (608). The client device can sent the first request (610). The data processing system can receive the first request (612). The data processing system can identify a resource identifier (614). The data processing system can identify a device identifier (616). The data processing system can store the identifiers (618). The client device can install an application (620). The client device can execute the application (622). The client device can generate a second request (624). The client device can send the second request (626). The data processing system can receive the second request (628). The data processing system can identify the device identifier (630). The data processing system can identify the application identifier (632). The data processing system can determine whether the application is validated (634). If validation is not successful, the data processing system can terminate (636). Otherwise, if validation is successful, the data processing system can retrieve the resource identifier (638). The data processing system can send the resource identifier (640). The client device can receive the resource identifier (642). The client device can access a component (644).

In further detail, the data processing system (e.g., the data processing system 110) can provide a content item (e.g., the content item 230) (602). The content item 230 can include a resource identifier (e.g., the resource identifier 235) to access a resource (e.g., the component 240) available via another application (e.g., the application 210B) that is not yet installed on the client device. A client device (e.g., the client device 130) can receive the content item (604). The client device can present the content item on a resource (e.g., the information resource 215) via an application (e.g., the application 210A).

The client device can monitor for an interaction with the content item (606). The interaction may be with the resource identifier included in the content item. If an interaction is detected, the client device can generate a first request (e.g., the initial request 310) (608). The first request can include a device identifier (e.g., the device identifier 315) and the resource identifier originally included in the content item. The client device can sent the first request (610).

The data processing system can receive the first request (612). The data processing system can parse the first request. The data processing system can identify a resource identifier (614). The resource identifier may have been included in the content item presented in the information resource via the client device. The data processing system can use the resource identifier to identity an application identifier (e.g., the application identifier 320) corresponding to the application to be installed on the client device. The data processing system can identify a device identifier (616). The device identifier can correspond to the client device. The data processing system can store the identifiers (618). The data processing system can associate the device identifier with the application identifier and the resource identifier (e.g., as the request entry 325) for storage onto a database (e.g., the database 205).

The client device can install an application (e.g., the application 210B) (620). The client device can invoke an application retrieval interface (e.g., the application retrieval interface 305) to request for the application. The application retrieval interface can send a request for the application (e.g., the application request 330) to an application distribution service (e.g., the application distribution service 125). The application distribution service 125 in turn can provide an installation package (e.g., the installation package 335) for installing the application. Upon receipt, the client device can use the installation package to install the application.

The client device can execute the application (622). The application can have a script or instructions in accordance with an application programming interface (API) (e.g., the link requester 400). The client device can generate a second request (e.g., the link request 410) (624). The second request can include a device identifier (e.g., the device identifier 315') corresponding to the client device and an application identifier (e.g., the application identifier 320') corresponding to the now installed application. The client device can send the second request (626).

The data processing system can receive the second request (628). The data processing system can parse the second request. The data processing system can identify the device identifier (630). The data processing system can identify the application identifier (632). The data processing system can determine whether the application is validated (634). Using the device identifier, the data processing system can search the database for the request for entry with a matching device identifier. If validation is not successful, the data processing system can terminate (636). The application on the client device can also present an initial interface.

Otherwise, if validation is successful, the data processing system can retrieve the resource identifier (638). The data processing system can identify the resource identifier associated with the device identifier and the application identifier in the second request. The data processing system can send the resource identifier (640). The resource identifier can be sent as part of a response (e.g., the response 505) to the second request. The client device can receive the resource identifier (642). The client device can access a resource (e.g., the component 240) (644). The client device can direct the application to access the resource using the resource identifier.

FIG. 7 shows the general architecture of an illustrative computer system 700 that may be employed to implement any of the computer systems discussed herein (including the data processing system 110 and its components, the content provider 115, the content publisher 120, the application distribution service 125 and its components, and the client device 130) in accordance with some implementations. The computer system 700 can be used to provide information via the network 730 for display. The computer system 700 comprises one or more processors 720 communicatively coupled to memory 725, one or more communications interfaces 705 communicatively coupled with at least one network 730 (e.g., the network 105), and one or more output devices 710 (e.g., one or more display units) and one or more input devices 715.

The processor 720 can include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory 725 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). The memory 725 can include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The processor(s) 720 shown in FIG. 7 may be used to execute instructions stored in the memory 725 and, in so doing, also may read from or write to the memory various information processed and or generated pursuant to execution of the instructions. The processors 720 coupled with memory 725 (collectively referred herein as a processing unit) can be included in the components of the system 100, such as the data processing system 110 (and also the content provider 115, the content publisher 120, the application distribution service 125 and its components, and the client device 130). For example, the data processing system 110 can include the memory 725 as the database 205. The processors 720 coupled with memory 725 (collectively referred herein as a processing unit) can be included in the content provider 115. For example, the content provider 115 can include the memory 725 to store the content items 225. The processors 720 coupled with memory 725 (collectively referred herein as a processing unit) can be included in the content publisher 120. For example, the content publisher 120 can include the memory 725 to store the information resource 215. The processors 720 coupled with memory 725 (collectively referred herein as a processing unit) can be included in the application distribution service 125. For example, the application distribution service 125 can include the memory 725 to store the installation packages 330. The processors 720 coupled with memory 725 (collectively referred herein as a processing unit) can be included in the client device 130. For example, the client device 130 can include the memory 725 to store the applications 210A and 210B and the application retrieval interface 305.

The processor 720 of the computer system 700 also may be communicatively coupled to or made to control the communications interface(s) 705 to transmit or receive various information pursuant to execution of instructions. For example, the communications interface(s) 705 may be coupled to a wired or wireless network, bus, or other communication means and may therefore allow the computer system 700 to transmit information to or receive information from other devices (e.g., other computer systems). While not shown explicitly in the system of FIG. 1-5 or 7, one or more communications interfaces facilitate information flow between the components of the system 700. In some implementations, the communications interface(s) may be configured (e.g., via various hardware components or software components) to provide a website as an access portal to at least some aspects of the computer system 700. Examples of communications interfaces 705 include user interfaces (e.g., the application 210A, the information resource 215, the content item 230, the application 210B, and the component 240), through which the user can communicate with other devices of the system 100.

The output devices 710 of the computer system 700 shown in FIG. 7 may be provided, for example, to allow various information to be viewed or otherwise perceived in connection with execution of the instructions. The input device(s) 715 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

The network 730 can include computer networks such as the internet, local, wide, metro or other area networks, intranets, satellite networks, other computer networks such as voice or data mobile phone communication networks, and combinations thereof. The network 730 may be any form of computer network that relays information among the components of the system 100, such as the data processing system 110 and its components, the content provider 115, the content publisher 120, the application distribution service 125 and its components, and the client device 130. For example, the network 730 may include the Internet and/or other types of data networks, such as a local area network (LAN), a wide area network (WAN), a cellular network, satellite network, or other types of data networks. The network 730 may also include any number of computing devices (e.g., computer, servers, routers, network switches, etc.) that are configured to receive and/or transmit data within network 730. The network 730 may further include any number of hardwired and/or wireless connections. The client device 130 may communicate wirelessly (e.g., via WiFi, cellular, radio, etc.) with a transceiver that is hardwired (e.g., via a fiber optic cable, a CAT5 cable, etc.) to other computing devices in network 730.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 630).

The operations described in this specification can be implemented as operations performed by a data processing apparatus on data stored on one or more computer-readable storage devices or on data received from other sources. The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 700 or system 100 can include clients and servers. For example, the data processing system 110 and its components, the content provider 115, the content publisher 120, and the application distribution service 125 and its components, of the system 100 can each include one or more servers in one or more data centers or server farms. A client (e.g., the client device 130) and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content selector 200, the initial request handler 300, the link request handler 405, the application validator 500, and the database 205 can be part of the data processing system 110, a single module, a logic device having one or more processing modules, or one or more servers.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to passing data via resource identifiers for application components, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method of passing data via resource identifiers, comprising:

receiving, by a data processing system having one or more processors, a first request for content from a client device responsive to an interaction with a content item presented on a first resource on the client device, the content item including a resource identifier referencing a second resource accessible via an application to be installed on the client device, the first request including the resource identifier and a device identifier corresponding to the client device;

receiving, by the data processing system, a second request for content from the client device responsive to an execution of the application installed on the client device, the second request including the device identifier corresponding to the client device and an application identifier corresponding to the application;

determining, by the data processing system responsive to receiving the second request, that the application installed on the client device is to receive the request identifier included in the first request based on the device identifier and the resource identifier included in the first request and the device identifier and the application identifier included in the second request; and providing, by the data processing system responsive to determining that the application is to receive the request identifier, the resource identifier to direct the application to access the second resource accessible via the resource identifier for presentation via the application.

2. The method of claim 1, further comprising:

receiving, by the data processing system, prior to receiving the first request and the second request, a third request for content from the client device for presentation on the first resource, the third request including the device identifier corresponding to the client device;

determining, by the data processing system, that the application is not installed on the client device by accessing a database using the device identifier, the database maintaining device identifiers by applications installed on corresponding client devices; and selecting, by the data processing system, responsive to determining that the application is not installed on the client device, the content item from a plurality of content items to provide to the client device for display on the first resource in a second application different from the application.

3. The method of claim 1, further comprising:

identifying, by the data processing system responsive to receiving the first request, the application identifier corresponding to the application to be installed on the client device based on the resource identifier included in the first request;

storing, by the data processing system, on a database, the device identifier and the application identifier as associated with the resource identifier; and identifying, by the data processing system, from the database, the device identifier and the application identifier, responsive to receiving the second request from the client device, and wherein determining that the application is to receive the resource identifier further comprises determining that the device identifier included in the first request matches the device identifier included in the second request and the application identifier identified responsive to receiving the first request matches the application identifier included in the second request.

4. The method of claim 1, further comprising:

generating, by the data processing system responsive to receiving the first request, a first event identifier based on the device identifier included in the first request and the application identifier corresponding to the resource identifier included in the first request; and generating, by the data processing system responsive to receiving the second request, a second event identifier based on the device identifier and the application identifier included in the second request, and wherein determining that the application is to receive the resource identifier further comprises determining that the application is to receive the resource identifier by determining that the second event identifier generated from the second request matches the first event identifier generated from the first request.

5. The method of claim 1, further comprising:

receiving, by the data processing system, from the client device, a third request for content generated responsive to the execution of the application installed on the client device, the second request including at least one of a second device identifier different from the device identifier and a second application identifier different from the application identifier corresponding to the resource identifier included in the first request;

determining, by the data processing system responsive to receiving the third request, that application is not to receive the resource identifier based on at least one of determining that the second device identifier does not match the device identifier and determining that second application identifier does not match the application identifier; and restricting, by the data processing system responsive to determining that the application is not to receive the resource identifier, provision of the resource identifier to the client device to cause the application to present an initial interface.

6. The method of claim 1, further comprising:

determining, by the data processing system responsive to determining that the application is to receive the resource identifier, that the resource identifier referencing the second resource to access via the application is invalid; and restricting, by the data processing system responsive to determining that the resource identifier is invalid, provision of the resource identifier to the client device to cause the application to present an initial interface.

7. The method of claim 1, further comprising:

identifying, by the data processing system, responsive to receiving the first request, the application identifier corresponding to the application to be installed on the client device based on the content item provided to the client device; and associating, by the data processing system, the device identifier and the application identifier from the first request for content with the resource identifier included in the content item provided to the client device.

8. The method of claim 1, further comprising:
    determining, by the data processing system, that a length of time between receiving the first request and receiving the second request satisfies a time limit; and
    wherein determining that the application is to receive the resource identifier further comprises determining that the application is to receive the resource identifier in response to determining that the time delay satisfies the time limit.

9. The method of claim 1, wherein receiving the first request for content further comprises receiving the first request responsive to the interaction with the content item presented on the first resource source presented on a second application different from the application on the client device, the interaction with the content item causing the client device to initiate an application retrieval interface to install the application responsive to determining that the application is not installed on the client device.

10. The method of claim 1, wherein receiving the second request for content further comprises receiving the second request generated by the application responsive to a preconfigured function call initiated by the application for retrieval of the resource identifier.

11. A system for passing data via resource identifiers, comprising:
    a data processing system having one or more processors, configured to:
       receive a first request for content from a client device responsive to an interaction with a content item presented on a first resource on the client device, the content item including a resource identifier referencing a second resource accessible via an application to be installed on the client device, the first request including the resource identifier and a device identifier corresponding to the client device;
       receive a second request for content from the client device responsive to an execution of the application installed on the client device, the second request including the device identifier corresponding to the client device and an application identifier corresponding to the application;
       determine, responsive to receiving the second request, that the application installed on the client device is to receive the request identifier included in the first request based on the device identifier and the resource identifier included in the first request and the device identifier and the application identifier included in the second request; and
       provide, responsive to determining that the application is to receive the request identifier, the resource identifier to direct the application to access the second resource accessible via the resource identifier for presentation via the application.

12. The system of claim 11, wherein the data processing system is further configured to:
    receive, prior to receiving the first request and the second request, a third request for content from the client device for presentation on the first resource, the third request including the device identifier corresponding to the client device;
    determine that the application is not installed on the client device by accessing a database using the device identifier, the database maintaining device identifiers by applications installed on corresponding client devices; and
    select, responsive to determining that the application is not installed on the client device, the content item from a plurality of content items to provide to the client device for display on the first resource in a second application different from the application.

13. The system of claim 11, wherein the data processing system is further configured to:
    identify, responsive to receiving the first request, the application identifier corresponding to the application to be installed on the client device based on the resource identifier included in the first request;
    store, on a database, the device identifier and the application identifier as associated with the resource identifier;
    identify, from the database, the device identifier and the application identifier, responsive to receiving the second request from the client device; and
    determine that the device identifier included in the first request matches the device identifier included in the second request and the application identifier identified responsive to receiving the first request matches the application identifier included in the second request.

14. The system of claim 11, wherein the data processing system is further configured to:
    generate, responsive to receiving the first request, a first event identifier based on the device identifier included in the first request and the application identifier corresponding to the resource identifier included in the first request;
    generate, responsive to receiving the second request, a second event identifier based on the device identifier and the application identifier included in the second request; and
    determine that the application is to receive the resource identifier by determining that the second event identifier generated from the second request matches the first event identifier generated from the first request.

15. The system of claim 11, wherein the data processing system is further configured to:
    receive, from the client device, a third request for content generated responsive to the execution of the application installed on the client device, the second request including at least one of a second device identifier different from the device identifier and a second application identifier different from the application identifier corresponding to the resource identifier included in the first request;
    determine, responsive to receiving the third request, that application is not to receive the resource identifier based on at least one of determining that the second device identifier does not match the device identifier and determining that second application identifier does not match the application identifier; and
    restrict, responsive to determining that the application is not to receive the resource identifier, provision of the resource identifier to the client device to cause the application to present an initial interface.

16. The system of claim 11, wherein the data processing system is further configured to:
    determine, responsive to determining that the application is to receive the resource identifier, that the resource identifier referencing the second resource to access via the application is invalid; and
    restrict, responsive to determining that the resource identifier is invalid, provision of the resource identifier to the client device to cause the application to present an initial interface.

17. The system of claim 11, wherein the data processing system is further configured to:

identify, responsive to receiving the first request, the application identifier corresponding to the application to be installed on the client device based on the content item provided to the client device; and associate the device identifier and the application identifier from the first request for content with the resource identifier included in the content item provided to the client device.

18. The system of claim 11, wherein the data processing system is further configured to:

determine that a length of time between receiving the first request and receiving the second request satisfies a time limit; and determine that the application is to receive the resource identifier in response to determining that the time delay satisfies the time limit.

19. The system of claim 11, wherein the data processing system is further configured to receive the first request responsive to the interaction with the content item presented on the first resource source presented on a second application different from the application on the client device, the interaction with the content item causing the client device to initiate an application retrieval interface to install the application responsive to determining that the application is not installed on the client device.

20. The system of claim 11, wherein the data processing system is further configured to receive the second request generated by the application responsive to a preconfigured function call initiated by the application for retrieval of the resource identifier.

* * * * *